STEREO FM TRANSMISSION SYSTEM

Filed April 18, 1960 2 Sheets-Sheet 1

INVENTOR.
Carl G. Eilers
BY Francis W. Crotty
Atty.

June 21, 1966 C. G. EILERS 3,257,512

STEREO FM TRANSMISSION SYSTEM

Filed April 18, 1960 2 Sheets-Sheet 2

INVENTOR.
Carl G. Eilers
BY Francis W. Crotty
Atty.

3,257,512
STEREO FM TRANSMISSION SYSTEM
Carl G. Eilers, Fairbury, Ill., assignor to Zenith Radio Corporation, a corporation of Delaware
Filed Apr. 18, 1960, Ser. No. 23,030
8 Claims. (Cl. 179—15)

This invention relates to a new and improved transmission system and more particularly to a stereo frequency modulation transmission system which is compatible with existing monaural frequency modulation standards.

In the copending application of Robert Adler et al., Serial No. 22,926 for Stereo FM Transmission System filed concurrently herewith, there is described a stereo frequency modulation transmission system in which two substantially independent audio signals are transmitted over a single frequency modulation channel. In that system, the two audio signals are initially multiplexed on a time-division basis, the multiplexed or modulated signals being combined to produce sum and difference signals. These sum and difference signals are subsequently combined to develop a composite modulation signal representative of both audio signals. This composite signal is then utilized to frequency-modulate a high-frequency carrier, in conventional manner, to develop a transmission signal. In the receiver, the transmitted signal is first demodulated in the usual manner and is subsequently applied to a high-frequency switching device, synchronized with the multiplexing apparatus of the transmitter, to reconstitute the initial audio signals. The transmitted signal of the Adler et al. system is compatible with existing frequency modulation standards in that it can be received and utilized by a conventional frequency modulation receiver, which produces an output representative of the sum of the two stereo signals.

The aforementioned Adler et al. system for stereo frequency modulation broadcasting entails a time-division multiplexing operation which may be considered to be equivalent to the multiplication of each of the two audio signals by a switching signal. Where the sampling or multiplex transients are very fast, which is customary, the switching function is generally of rectangular wave form, having a fundamental frequency and many harmonics. As a consequence, the signal developed by the multiplication includes the fundamental and a like number of harmonics of the fundamental switching frequency; transmission of this entire complement of harmonics increases the possibility of out-of-channel radiation and leaves no room to accommodate other services, such as background music. Moreover, it has been found that these harmonic components do not carry any audio information which is not included in the low-frequency components of the signal developed through the multiplication or time-division multiplexing signal. The Adler et al. application discloses that all of the information necessary for the transmission of the stereo program is contained in a frequency band which extends up to and includes the modulation components adjacent the fundamental of the switching frequency. The present invention is an improvement and further development of the Adler et al. system and features the generation of the composite modulating signal for the frequency modulation carrier without simultaneously creating the range of harmonic modulation products characteristic of time-division multiplexing.

An object of the invention is to provide a new and improved transmitter for a frequency modulation stereo system which develops a compatible signal but which also is effective to utilize, in a highly efficient manner, virtually the full deviation range available in existing frequency modulation transmission channels for the transmission of information reproducible by a conventional monaural receiver.

An additional object of the invention is to provide a new and improved frequency modulation stereo transmission system which requires a minimum of modification of existing transmitter equipment and, in fact, utilizes to a large extent the complete transmitter equipment available at existing monaural frequency modulation stations.

It is a further object of the invention to provide a new and improved stereo frequency modulation transmission system which affords many of the advantages and benefits of a time-division multiplex transmission system but in which the higher harmonic modulation components characteristic of time-division multiplexing are not generated.

A related object of the invention is to afford a new and improved modulation system for a frequency modulation stereo transmitter which effectively time-multiplexes the two audio signals necessary for stereo transmission by means of conventional amplitude-modulation circuits operating with a substantially sinusoidal subcarrier signal.

Accordingly, a transmitter for a stereo frequency modulation transmission system, constructed in accordance with the invention, comprises a pair of audio signal sources for developing first and second audio signals A and B. Circuit means are provided for combining the audio signals to develop a sum signal $(A+B)$ and a difference signal $(A-B)$. The transmitter further includes a generator for generating a subcarrier signal S having a frequency of at least twice, and preferably more than twice, the highest audio frequency to be transmitted. For example, the subcarrier may be at a frequency of thirty to fifty kilocycles. A suppressed-carrier amplitude modulator is used to amplitude modulate the subcarrier with the difference signal to develop a double-sideband suppressed carrier amplitude-modulated subcarrier signal $(A-B)\cos\omega_s t$. Frequency modulation means, which may be conventional in construction, are provided, and the double-sideband amplitude-modulated subcarrier signal, the sum signal and a carrier signal are all applied to the frequency modulation means to generate a transmission signal in which the carrier signal is frequency-modulated in accordance with the modulation function $$M(t)=K_1(A+B)+K_2(A-B)S$$

Preferably, the constants $K_1$ and $K_2$ are substantially equal. The foregoing modulation function further preferably includes a term $K_3S'$ where $K_3$ is a constant substantially smaller than either $K_1$ or $K_2$ and $S'$ is a pilot signal related in frequency to the subcarrier.

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

Figures 1, 4:
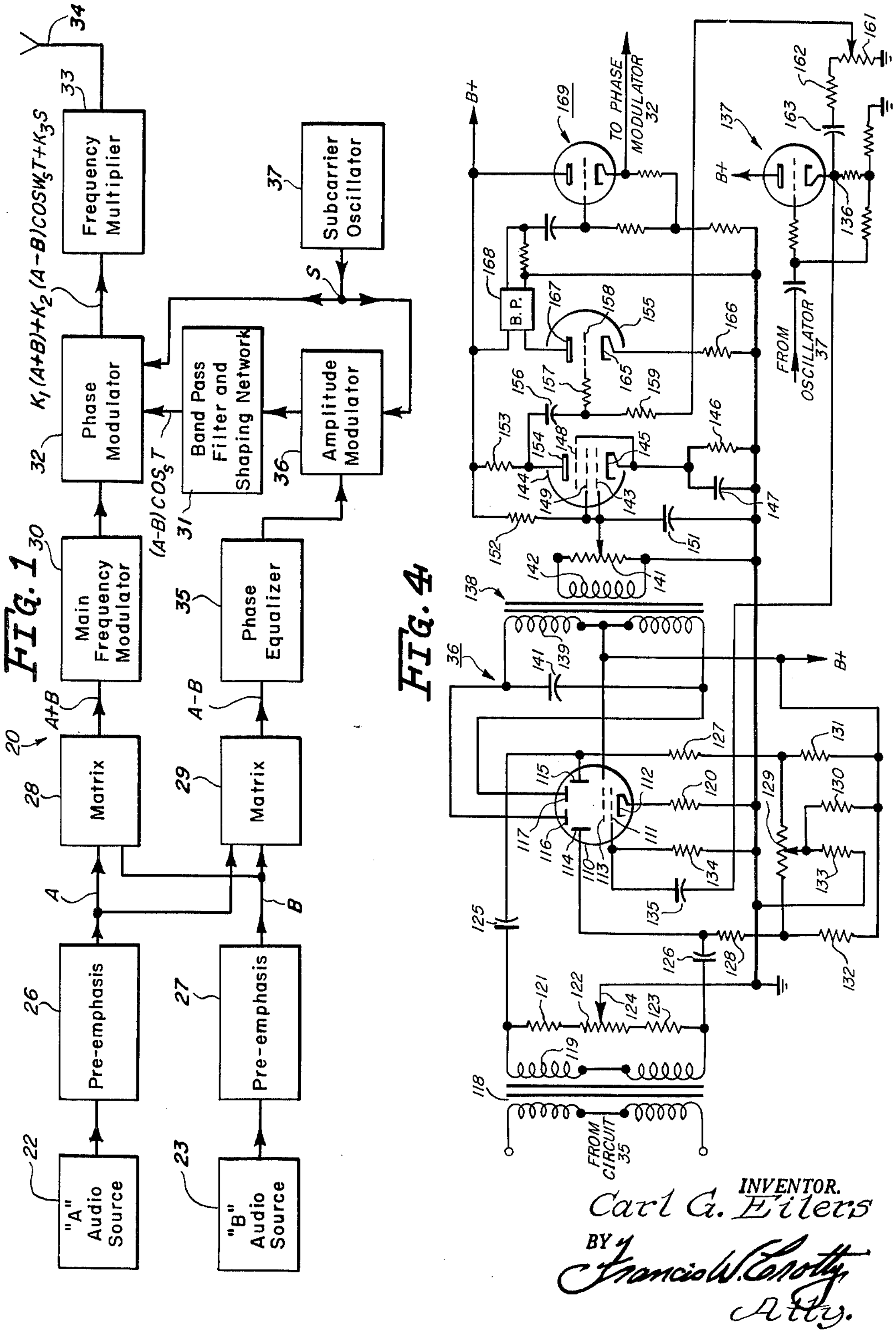
FIGURE 1 is a simplified block diagram of a transmitter constructed in accordance with one embodiment of the invention.
FIGURE 4 is a detail schematic diagram of a preferred form of certain operating circuits in the transmitter of FIGURE 1.
Figures 2, 3, 5:
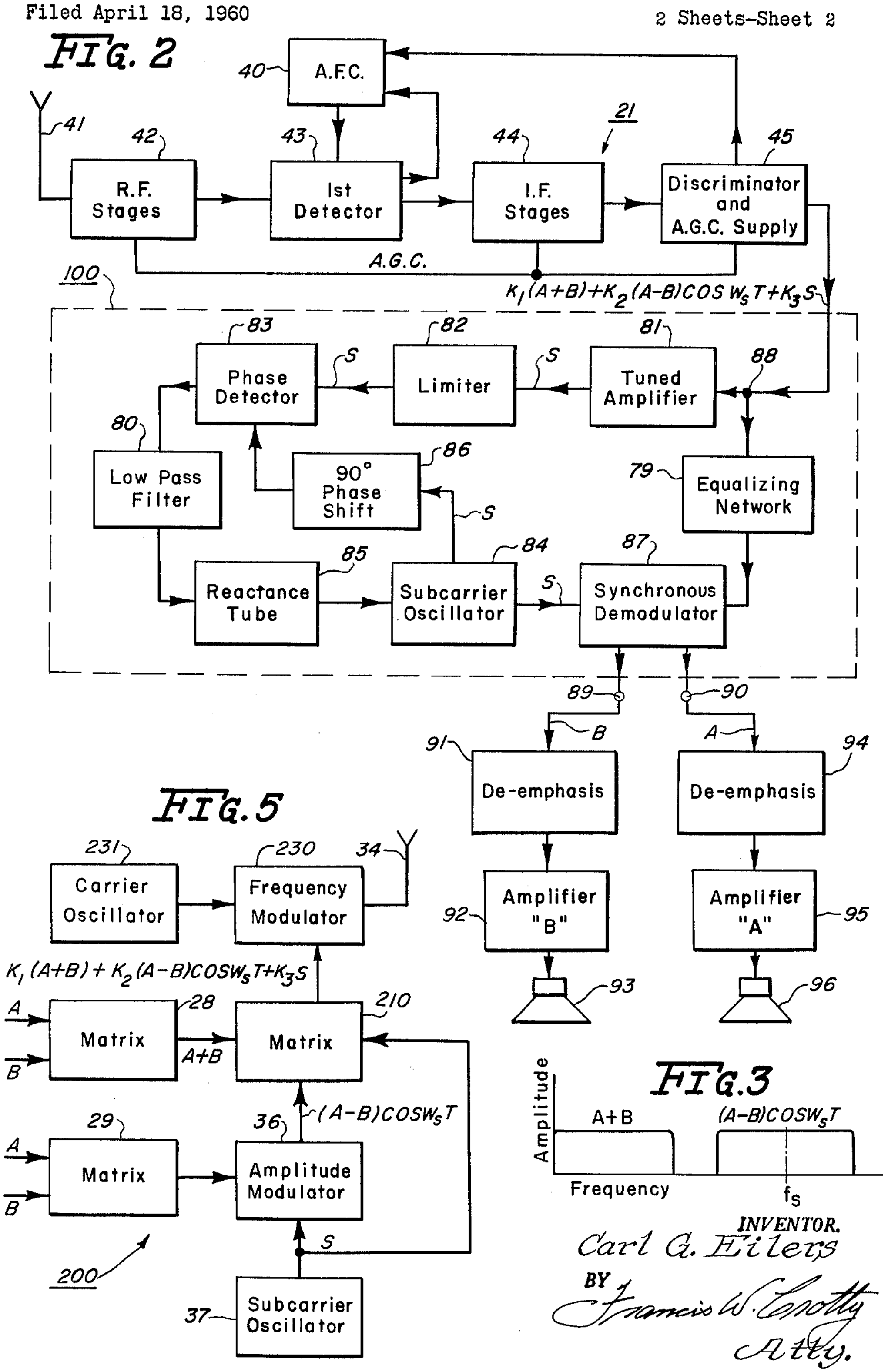
FIGURE 2 is a simplified block diagram of a receiver which may be utilized in conjunction with the transmitter of FIGURE 1 in a frequency modulation stereo transmission system constructed in accordance with the invention.
FIGURE 3 is a frequency distribution diagram of the composite modulation signal of the transmitter of FIGURE 1.
FIGURE 5 is a block diagram of a modification of the transmitter of FIGURE 1.

The transmitter 20 of FIGURE 1, taken in conjunction with the receiver 21 illustrated in FIGURE 2, constitutes a complete frequency modulation stereo system which is compatible with current monaural frequency modulation broadcasting standards. The transmitter comprises a first audio source 22 and a second audio source 23, these sources being designated in the block diagram as audio source A and audio source B. The audio source 22 may comprise an individual microphone, one of two pickup circuits of a record player capable of reproducing a stereo recording, or any other suitable source of audio signals. Similarly, the second source 23 may comprise any suitable source of audio signals related to source A in the usual fashion of stereophonic sound. The audio signal from source 22 may be represented by the following expression:

$$A=\cos w_A t \quad (1)$$

Similarly, the output signal from the second audio source 23, may be represented by the expression:

$$B=\cos w_B t \quad (2)$$

Audio sources 22 and 23 are individually coupled to a pair of conventional pre-emphasis circuits 26 and 27, respectively, to derive an advantage relative to noise as well understood in the art. Frequently, a pre-emphasis network is incorporated in the modulator and if networks 26, 27 are employed the pre-emphasis network in the modulator is removed or shunted. Pre-emphasis circuit 26 is connected to a first matrix or adder circuit 28, whereas pre-emphasis circuit 27 is coupled to a second matrix or subtractor circuit 29. In addition, circuit 26 is connected to matrix 29 while circuit 27 is coupled to matrix 28.

The output of matrix 28 is coupled to a frequency modulator 30 which will be assumed to include an oscillator for supplying the carrier to be modulated. Modulator 30 comprises one modulation stage in a frequency-modulation system of known construction that also includes a second modulator 32, sometimes referred to as the phase modulation stage. Actually, both stages 30 and 32 are effective to frequency-modulate an applied signal; other arrangements are known in which this may be accomplished in a single stage. The second modulation stage 32 is coupled to the output of main modulator 30 and has an output circuit coupled to a frequency multiplier 33 which includes at least one and perhaps more stages of multiplication, depending upon the center frequency desired of the signal to be radiated from a transmitting antenna 34.

The output of matrix circuit 29 is coupled to a phase equalization circuit 35 which, in turn, is coupled to an amplitude modulator 36 of the suppressed-carrier type. Modulator 36, which is described in detail hereinafter, is also coupled to the output of a subcarrier oscillator 37 which develops a substantially sinusoidal subcarrier signal S which may be represented as $$S=\cos w_S t \quad (3)$$

Subcarrier signal S has a frequency substantially greater than the highest audio frequency to be transmitted, preferably more than twice the highest audio frequency. For example, the operating frequency of oscillator 37 may be in the range from thirty to fifty kilocycles. The output of modulator 36 is coupled to the second modulation stage 32 of the transmitter through a band-pass filter and shaping network. The band-pass filter restricts the signal delivered to stage 32 to the modulation components adjacent the fundamental of the subcarrier from oscillator 37 and the wave shaping network effects the usual conversion from phase to frequency modulation by operating on the modulation signal by the factor $1/f$, where $f$ stands for frequency.

At the outset, each of the audio signals from the sources 22 and 23 is pre-emphasized, in conventional manner to attenuate the low-frequency portion of each audio signal relative to the high-frequency components. Following pre-emphasis, audio signals A and B are additively combined in matrix 28 to produce an output signal of the form $(A+B)$. This signal is directly applied to frequency-modulator 30 and is modulated therein on the carrier signal developed by the associated oscillator in accordance with conventional practice.

The two signals A and B are also applied to matrix 29, which combines them in the proper phase relation to develop an output signal of the form $(A-B)$. This difference signal is transmitted through phase equalization circuit 35 to amplitude-modulator 36 wherein the difference signal is amplitude-modulated on subcarrier signal S to develop a suppressed-carrier amplitude-modulated subcarrier signal of the form:

$$(A-B)S \quad (4)$$

This amplitude-modulated subcarrier signal is applied through filter 31 to modulation stage 32 of the transmitter to further modulate the frequency of the output signal from the modulator 30. It may also be desirable to couple subcarrier oscillator 37 to modulator 32, as shown in FIGURE 1, to provide for the transmission of the subcarrier as a pilot signal to facilitate synchronous demodulation at the receiving end of the system. The separate coupling from source 37 may be unnecessary if the modulator is constructed to transmit the subcarrier at very low amplitude to modulator 32. In either case the pilot signal has the same frequency as and is in phase with the fundamental of the difference-modulated subcarrier. As explained in the Adler et al. application, the pilot signal may be a harmonic or subharmonic of the fundamental frequency of the subcarrier and, as described in a concurrently filed application of Adrian J. DeVries, Serial No. 22,830 entitled Stereo FM Transmission System the pilot signal may be advantageously transmitted in phase quadrature to the subcarrier signal.

The output signal from modulation stage 32 is a carrier signal, at the base frequency of the oscillator associated with stage 30, which is frequency-modulated in accordance with the function:

$$M(t)=K_1(A+B)+K_2(A-B)S+K_3S \quad (5)$$

This signal is further multiplied in frequency in circuit 33 and is radiated from transmitter antenna 34. For example, the initial carrier frequency may be 11.0555 megacycles and multiplier 33 may include two tripling stages, affording a frequency modulation output signal having a center frequency of 99.5 megacycles. This particular frequency relationship has been utilized successfully in tests of the invention over station KS2XFJ in Chicago.

The transmitter of FIGURE 1 offers a number of substantial advantages over a direct time-division multiplexing system. In the first place, it is not necessary to develop a switching signal of square waveform or other complex wave form, as usually required in a time-division multiplex system. Instead, conventional amplitude modulation with a sinusoidal subcarrier signal is utilized in transmitter 20, substantially simplifying the circuitry and also making it easier to control or reduce the harmonic content of the signal output. The use of a sinusoidal modulation signal also eliminates problems which might otherwise arise with respect to differential delay of the difference signal components, contrasted with the sum signal components, within the transmitter circuits, and avoids distortion which might otherwise result from this source. By operating the transmitter in two separate frequency-modulation stages, it is possible to employ modulating circuits having a smaller effective deviation range which helps in applying the stereo system of the invention to existing frequency modulation broadcasting equipment. Because higher harmonics of the subcarrier signal are not utilized in the input to modulator 36, the likelihood of out-of-channel radiation is greatly reduced and, furthermore, auxiliary services such as background music may be conducted on the same channel as explained in the Adler et al. application.

The output signal from the transmitter is of the general form illustrated in FIGURE 3. The low-frequency end of the spectrum designated $(A+B)$ represents the sum of the A and B signals, whereas the high-frequency portion designated $(A-B)S$ represents the difference of the A and B signals, multiplied by the subcarrier signal S. The abscissa $fs$ is the pilot signal included in the composite modulation signal for purposes of synchronization. All of the desired or necessary audio signal information is included in these portions of the frequency diagram so filter 31 restricts the signal delivered to stage 32 to embrace only the $(A-B)S$ components, excluding higher order harmonic modulation components that may be available in the output of modulator 36.

This system affords substantial advantages with respect to economy of available deviation range, preserving most of the available range for signals representative of the audio information signals A and B. Moreover, the low-amplitude subcarrier transmission is advantageous from the standpoint of potential intermodulation difficulties. It can be demonstrated that the maximum deviation, within the limits of a fixed transmission bandwidth, can be achieved by making the two constants $K_1$ and $K_2$ in Equation 5 approximately equal to each other. This is achieved by adjusting the relative gain of those parts of the transmitter which handle the sum and difference signals. A condition in which $K_1$ equals $K_2$ is ideal in that the peak amplitudes of the sum and difference signals are equal as explained in the Adler et al. application. Thus, the transmission system of the invention makes it possible to transmit the stereo data without reducing the basic monaural $(A+B)$ frequency deviation.

To optimize the signal-to-noise ratio, it is desirable to keep the subcarrier frequency as low as practicable. A subcarrier frequency in the range of about thirty to fifty kilocycles is preferred. Adequate subcarrier information can be transmitted with a pilot carrier frequency swing of five kilocycles. Thus, for a total deviation of seventy-five kilocycles, the following constants may be employed:

$K_1$=70 kilocycles/second
$K_2$=70 kilocycles/second
$K_3$=5 kilocycles/second

FIGURE 2 illustrates a receiver 21 which may be utilized effectively in reproducing a broadcast from transmitter 20. Receiver 21, which is described in detail and claimed in the copending application of Adrian J. DeVries, filed concurrently herewith, comprises an antenna 41, a radio-frequency amplifier 42, a first detector 43, an intermediate-frequency amplifier 44, and a discriminator-limiter 45, all of which may be substantially conventional in construction. Accordingly, the output signal from discriminator 45 is of the general form set forth in Equation 5. As more fully explained in the Adler et al. application, it is desirable that the receiver have characteristics which are superior to those of present-day commercially available monaural frequency modulation receivers. In particular, it is preferred that the receiver have high sensitivity so that the stereophonic signal-to-noise ratio is acceptable in fringe areas, its AM rejection properties are to be improved and its bandwidth characteristics should be better than those usually encountered in monaural receivers. Accordingly, the receiver includes an AGC supply within discriminator 45 and an AGC bus which applies a control potential to both the RF and IF amplifiers. Also, the oscillator of detector 43 is controlled as to frequency by an AFC control 40 which is connected to the local oscillator of detector 43 and to discriminator 45 to receive therefrom signals which are compared in the usual way to deriving an AFC control potential. The IF bandwidth is increased from its usual value of 150–180 kc. at the −6 decibel point to approximately 230 kc. Added AM rejection is desirable and is introduced by the use of two limiters or a single limiter followed by a ratio detector which contributes limiting effects. The bandwidth of the detector is about 300 kc.

The discriminator is connected to a frequency-selective amplifier 81 which is tuned to the fundamental frequency of the subcarrier signal S. The output of amplifier 81 is coupled to a limiter 82, which in turn, is coupled to a phase detector 83. The phase detector 83 is connected in an automatic phase control loop comprising a subcarrier oscillator 84, a low-pass filter 80, a reactance tube 85, and a phase shifting circuit 86. Oscillator 84 is also coupled to a synchronous demodulator 87, demodulator 87 being further coupled to the output of discriminator 45 through an equalizer network 79. Demodulator 87 includes two output circuits, identified by the terminals 89 and 90. Output terminal 89 is coupled to a de-emphasis circuit 91 of conventional construction which, in turn, is coupled to a suitable amplifier 92 that drives a loudspeaker or other transducer 93. Similarly, output terminal 90 of demodulator 87 is coupled to a utilization circuit, comprising, in series, a de-emphasis circuit 94, an amplifier 95, and a suitable speaker or other transducer 96.

In considering the operation of the receiver, it may be considered that the signal appearing at input terminal 88 of the stereo demodulation system 100 is of the general form set forth in Equation 5. This signal is applied to tuned amplifier 81 which selects the pilot or subcarrier signal S and applies it to limiter 82. The output signal from the limiter is applied to phase detector 83. At the same time, oscillator 84 develops an output signal at approximately the frequency of the subcarrier signal, and this signal is concurrently applied, through phase shifting circuit 86, to phase detector 83. The phase detector operates in conventional manner to develop an output signal representative of phase differences between the two applied signals, and this output signal is applied to reactance tube 85 through low-pass filter 80. The conductive condition of the reactance tube controls the reactance it contributes to the frequency-determining circuit of oscillator 84 and the effective operating frequency of the oscillator. In this manner, oscillator 84 is established and maintained in phase and frequency synchronization with the received subcarrier signal S as represented by the pilot-signal modulation component of the received transmission.

The composite modulation signal of Equation 5, appearing at terminal 88, is also applied through equalizing network 79 to synchronous demodulator 87. This demodulator develops two distinct output signals at terminals 89 and 90. One of these output signals is directly representative of the initial audio signal A, and the other is directly representative of the initial audio signal B, no further matrixing being required in the receiver.

In the Adler et al. application it is explained that the ideal transmission is that of Equation 5 herein with constant $K_1$ equal to constant $K_2$. It is further explained that if this condition is modified by arranging that the ratio of the coefficients $K_1$ to $K_2$ is $2/\pi$, the desired signals A and B may be derived by operating upon the composite modulation signal with a signal of approximately square wave form. This is the same type of operation accomplished in the receiver of FIGURE 2 especially if demodulator 87 includes a beam deflection tube as described in the above-identified DeVries application. With such a demodulator, the beam is intensity modulated by the signal delivered from equalizing network 79 and is deflected as between a pair of output anodes or electrodes by subcarrier signal S applied to the deflectors in push-pull. If the peak amplitude of the deflection signal is large enough, it exhibits a steep slope at its crossings of the AC axis and therefore has essentially the same effect on the operation of the deflection tube demodulator as a deflection signal of square wave form. The coefficients of the composite modulation signal are modified in network 79 to the end that the required A and B signals are developed in the output circuits of the demodulator. Of course, the output signals also include components representative of the subcarrier S, since this signal is included in the composite signal applied to the demodulator. However, this portion of the output signals may be effectively attenuated by suitable filter circuits in the demodulator so that the signals appearing at output terminals 89 and 90 are representative of the desired audio signals A and B of Equations 1 and 2, except for the effect of the pre-emphasis. The output signal at terminal 89 is de-emphasized in circuit 91 and utilized to drive amplifier 92 and loudspeaker 93. The output signal at terminal 90 is de-emphasized in circuit 94, amplified in circuit 95, and employed to drive the second loudspeaker 96.

The receiver of FIGURE 2 is relatively simple and inexpensive in construction, and is generally similar to a conventional frequency modulation receiver except for the incorporation therein of demodulation system 100. Demodulation system 100 is highly effective and accurate in reconstituting the initial audio signals A and B, and presents none of the difficulties usually attendant upon separate demodulation to develop sum and difference signals $(A+B)$ and $(A-B)$, followed by matrixing to recover the A and B signals. The described demodulation system presents little or no difficulty with respect to differential delay or attenuation between the two audio signals.

FIGURE 4 illustrates a suitable circuit arrangement for suppressed-carrier amplitude modulator 36 of FIGURE 1. It also shows means for combining the pilot signal with the amplitude-modulated output signal from modulator 36 for application to phase modulator 32.

The amplitude modulator is of the beam-deflection type and comprises a beam deflection tube 110 having a cathode 111, an intensity control electrode 112, a screen electrode 113, a pair of deflectors 114 and 115, and a pair of output electrodes or anodes 116 and 117. One of the input circuits of modulator 36 comprises a transformer 118 having a primary winding which is included in phase equalizer 35 and a secondary winding 119 across which three resistors 121, 122 and 123 are connected in series. The center resistor 122 is a potentiometer having a variable tap 124 that is returned to a plane of reference potential, here shown as ground. One end of transformer secondary 119 is coupled to deflector 115 of deflection tube 110 by means of a coupling capacitor 125. The other end of the transformer secondary is similarly coupled to deflector 114 through a coupling capacitor 126. The necessary D.C. operating potential for the two deflectors is provided by a balancing circuit comprising a resistor 127 connected to deflector 115 and a similar resistor 128 connected to deflector 114, resistors 127 and 128 being connected to the end terminals of a potentiometer 129. The tap on this potentiometer is returned to a suitable B+ supply through a resistor 130. The balancing circuit also includes a pair of resistors 131 and 132 which are connected individually from resistors 127 and 128, respectively, to the B+ supply. Resistor 130 comprises one-half of a voltage divider, the other half of the voltage divider comprising a resistor 133 connected from the tap on potentiometer 129 to ground.

A second input circuit for modulator 36 is coupled to control electrode 112 of beam deflection tube 110. This circuit comprises a load resistor 134 that is connected from electrode 112 to ground. A coupling capacitor 135 is connected from control electrode 112 to the output terminal 136 of a cathode follower 137. Cathode follower 137 comprises the output stage of subcarrier oscillator 37 of FIGURE 1 and is utilized as a buffer between the subcarrier oscillator and amplitude modulator 36. Cathode 111 of tube 110 is returned to ground through a resistor 120.

The output circuit for modulator 36 comprises a transformer 138 having a primary winding 139 tuned by a capacitor 141 and connected between anodes 116 and 117 of deflection tube 110. The resonant frequency of the transformer is equal to the subcarrier frequency which, in the particular embodiment under consideration is thirty-nine kilocycles. Primary winding 139 is provided with a center tap that is returned to the B+ supply, the screen electrode of tube 110 also being returned to B+ in the same circuit.

A potentiometer 141 is connected across the secondary winding 142 of transformer 138 and has one terminal returned to ground. The tap of the potentiometer is connected to the control electrode 143 of an amplifier pentode section 144. The cathode 145 of tube 144 is returned to ground through a resistor 146 bypassed by a capacitor 147. Cathode 145 is also connected to the shield electrode 148 of tube 144. The screen electrode 149 is bypassed to ground through a capacitor 151 and is connected to the B+ supply by a resistor 152.

The output circuit of amplifier tube 144 comprises a load resistor 153 which connects the anode 154 of the tube to the B+ supply. Anode 154 is also coupled to a mixer or adder circuit comprising a triode 155, the coupling circuit including a capacitor 156 and a resistor 157 connected in series between anode 154 and the control electrode 158 of triode 155. Control electrode 158 is also connected to buffer amplifier 137 by means of a second input circuit comprising, in series, resistor 157, a further resistor 159, and a potentiometer 161. One terminal of potentiometer 161 is grounded and the other terminal is connected to output terminal 136 of the buffer amplifier through the series combination of a resistor 162 and a coupling capacitor 163.

The cathode 165 of the mixer or adder amplifier 155 is returned to ground through a resistor 166. The anode 167 is connected to a band-pass filter 168, the band-pass filter affording a connection from anode 167 to the B+ supply. The output of filter 168 is coupled to another cathode follower amplifier 169 which supplies the output signal to phase modulator 30 of FIGURE 1.

To operate modulator 36, potentiometer 129 is adjusted to afford a static balance of the electron beam from cathode 111 relative to anodes 116 and 117 to the end that the beam current is equally distributed between the anodes in the absence of a signal applied to deflectors 114 and 115. Potentiometer 124, on the other hand, is adjusted to achieve linearity in the modulator tube. After these adjustments have been made, the audio signal is applied to deflectors 114 and 115 through transformer 118 to deflect the electron beam in tube 110 as between its anodes 116 and 117 at a rate determined by the frequency of the input signal. At the same time, the subcarrier signal applied to control electrode 112 modulates the intensity of the electron beam at a frequency corresponding to the operating frequency of the subcarrier oscillator 137. The conjoint effect of the two signals, in view of the characteristics of the deflection tube, is an intermodulation of the applied signals. The output signal applied to primary 139 of output transformer 138 includes primarily the modulation products adjacent the fundamental frequency of the subcarrier S. It is of the form of Equation 4, supra. The modulator is balanced relative to the subcarrier and therefore this component is balanced out in transformer 138. The output signal is substantially restricted to the modulation components of the two input signals, although some unmodulated audio may appear across resistor 141. Thus, modulator 36 functions as a suppressed-carrier amplitude modulator and does not produce any substantial signal, at the subcarrier frequency, in its output circuit.

The modulated output signal is amplified in tube 144 and is supplied to triode mixer 155. In addition, a synchronization or pilot signal representative of the subcarrier is supplied to control electrode 158 of tube 155. Since this synchronization signal is taken directly from buffer amplifier 137, the output stage of the subcarrier oscillator, it is effectively locked in phase and frequency to the subcarrier signal supplied to modulator 36. The relative amplitudes of the two signals applied to adder amplifier 155 are substantially different from each other. The amplitude of the modulated signal supplied from amplifier tube 144 is very much larger than the synchronization signal from buffer amplifier 137; the ratio between the two may be of the order of 15:1. This permits restricting the portion of the available deviation devoted to the transmission of the pilot signal to a minimum. It has been determined that this amplitude differential between the two signals can be maintained without adverse effect upon demodulation at a receiver, particularly with a receiver of the kind described in the copending application of Adrian J. DeVries, filed concurrently herewith.

In the output circuit of triode 155, band-pass filter 168 eliminates any higher harmonics of the subcarrier signal and unmodulated audio that may be present in the output of tube 158.

In order to afford a more complete disclosure of the modulation system illustrated in FIGURE 4, certain data with respect to circuit components and operating conditions are set forth hereinafter. It should be understood that this material is presented solely by way of illustration and in no sense as a limitation on the invention.

Vacuum tubes:

| | |
|---|---|
| 110 | QM 539 |
| 144, 155 | 6U8 |
| 169 | 6C4 |
| 137 | ½ 6AU8 |

Resistors:

| | | |
|---|---|---|
| 121, 123 | kilohms | 12 |
| 122 | do | 25 |
| 127, 128, 130 | do | 220 |
| 129, 141, 161 | do | 5 |
| 120, 131, 132 | do | 270 |
| 134 | do | 470 |
| 146 | do | 1.5 |
| 152, 153 | do | 47 |
| 159 | do | 100 |
| 166 | ohms | 680 |

Capacitors:

| | | |
|---|---|---|
| 125, 126 | microfarads | 0.22 |
| 135, 141 | micromicrofarads | 1000 |
| 147, 151, 163 | microfarad | 0.1 |
| 156 | do | 0.01 |

Voltage supply:

| | | |
|---|---|---|
| B+ | volts | 280 |

FIGURE 5 illustrates a modification of transmitter 21 in which the manner of applying the modulation signal to the frequency modulator is somewhat different More specifically, the modulation system 200 shown in FIGURE 5 includes a further matrix circuit 210. Matrix 28, subcarrier oscillator 37 and amplitude modulator 36 are coupled to input terminals of matrix 210. Thus, in matrix circuit 210 all three of the signals which are required to formulate the composite modulation signal of Equation 5 are combined, in the necessary ratio. Adder 210 is coupled to a frequency modulator 230 driven by a carrier oscillator 231. In this embodiment the frequency modulation operation is effected in a single stage. Of course, it is necessary to include one or more stages of frequency multiplication in modulator 230, following the actual modulation stage, in order to achieve modulation linearity.

The described frequency modulation stereo transmission system exhibits all of the desirable attributes of the arrangement disclosed in the above-identified Adler et al. application. It is compatible in that the transmission may be utilized by present-day frequency modulation monaural receivers to produce high quality audio reproduction. The signal-to-noise ratio of the system, considered from the standpoint of monaural or stereophonic transmission, is acceptable and there is a minimum of cross talk between the main and sub-channels. It has the further advantage that the system may concurrently accommodate an auxiliary service such as that which is referred to as background music without materially deteriorating its performance with respect to monaural or stereophonic receivers.

While particular embodiments of the invention have been shown and described it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A transmitter for a stereo frequency modulation transmission system comprising: means for developing first and second audio signals A and B; circuit means for combining said audio signals to develop a sum signal $A+B$ and a difference signal $A-B$; a subcarrier signal generator for generating a subcarrier signal S having a frequency substantially higher than the highest audio frequency to be transmitted; means for suppressed-carrier amplitude-modulating said difference signal with said subcarrier to develop a double-sideband amplitude-modulated subcarrier signal $(A-B)\cos\omega_s t$; a frequency modulator; and means for effectively applying said double-sideband amplitude-modulated subcarrier signal and said sum signal to said frequency modulator to generate a transmission signal comprising a carrier signal frequency-modulated in accordance with the modulation function $$K_1(A+B)+K_2(A-B)\cos\omega_s t$$

where $K_1$ and $K_2$ are constants.

2. A transmitter for a stereo frequency modulation transmission system comprising: means for developing first and second audio signals A and B; circuit means for combining said audio signals to develop a sum signal $A+B$ and a difference signal $A-B$; a subcarrier signal generator for generating a substantially sinusoidal subcarrier signal S having a frequency substantially higher than the highest audio frequency to be transmitted; means for suppressed-carrier amplitude-modulating said difference signal with said subcarrier to develop a double-sideband amplitude-modulated subcarrier signal $$(A-B)\cos\omega_s t$$

frequency modulation means, including a carrier signal generator, and two series-connected modulators, each effective to modulate the frequency of said carrier signal in response to amplitude variations in an applied signal; and means for effectively applying said double-sideband amplitude-modulated subcarrier signal to one of said modulators and for applying said sum signal to the other of said modulators to generate a transmission signal in which said carrier signal is frequency-modulated in accordance with the modulation function $$K_1(A+B)+K_2(A-B)\cos\omega_s t$$

where $K_1$ and $K_2$ are constants.

3. A transmitter for a stereo frequency modulation transmission system comprising: means for developing first and second audio signals A and B; circuit means for combining said audio signals to develop a sum signal $A+B$ and a difference signal $A-B$; a subcarrier signal generator for generating a substantially sinusoidal subcarrier signal S having a frequency substantially higher than the highest audio frequency to be transmitted; suppressed-carrier modulator means for amplitude-modulating said difference signal with said subcarrier to develop a double-sideband amplitude-modulated subcarrier signal $(A-B)\cos\omega_s t$ in which the amplitude at the subcarrier frequency is negligible; frequency modulation means, including a carrier signal generator, and two modulators, each effective to modulate the frequency of said carrier signal in response to amplitude variations in an applied signal; and means for effectively applying said double-sideband amplitude-modulated subcarrier signal to one of said modulators and for applying said sum signal to the other of said modulators to generate a transmission signal in which said carrier signal is frequency-modulated in accordance with the modulation function, $$K_1(A+B)+K_2(A-B)\cos\omega_s t$$

where $K_1$ and $K_2$ are constants.

4. A transmitter for a stereo frequency modulated transmission system comprising: means for developing first and second audio signals A and B; circuit means for combining said audio signals to develop a sum signal $A+B$ and a difference signal $A-B$; a subcarrier signal generator for generating a substantially sinusoidal subcarrier signal S having a frequency of at least twice the highest audio frequency to be transmitted; suppressed-carrier modulator means for amplitude-modulating said difference signal with said subcarrier to develop a double-sideband amplitude-modulated subcarrier signal $$(A-B)\cos\omega_s t$$

in which the signal amplitude at the subcarrier frequency is substantially attenuated relative to sum and difference modulation components; means for deriving a pilot signal S' related in frequency to said subcarrier matrix means for additively combining said sum signal, said pilot signal and said double-sideband amplitude-modulated subcarrier signal to develop a modulation signal of the general form $$M(t)=K_1(A+B)+K_2(A-B)\cos\omega_s t+K_3S'$$

where $K_1$–$K_3$ are constants, frequency modulation means, including a carrier signal generator, for modulating the frequency of a carrier signal in response to variations in amplitude of an applied signal; and means for effectively applying said modulation signal to said frequency modulation means to generate a transmission signal frequency modulated in accordance with said modulation signal.

5. A transmitter for a stereo frequency modulation transmission system comprising: first and second audio signal sources for developing first and second audio signals A and B; circuit means for combining said audio signals to develop a sum signal $A+B$ and a difference signal $A-B$; a subcarrier signal generator for generating a subcarrier signal S having a frequency of at least twice the highest audio frequency to be transmitted; a suppressed-carrier amplitude modulator circuit for amplitude modulating said difference signal with said subcarrier to develop a double-sideband amplitude-modulated subcarrier signal $(A-B)\cos\omega_s t$; means for deriving a pilot signal S' related in frequency to said subcarrier; frequency modulation means, including a carrier signal generator, for modulating the frequency of a carrier signal in response to variations in amplitude of an applied signal; and means for effectively applying said double-sideband amplitude-modulated subcarrier signal, said pilot signal, and said sum signal to said frequency modulation means to generate a transmission signal in which said carrier signal is frequency-modulated in accordance with the modulation function $$F=K_1(A+B)+K_2(A-B)\cos\omega_s t+K_3S'$$

where $K_1$–$K_3$ are constants and the constant $K_3$ is much smaller than the constants $K_1$ and $K_2$.

6. A transmitter for a stereo frequency modulation transmission system comprising: means for developing first and second audio signals A and B; circuit means for combining said audio signals to develop a sum signal $A+B$ and a difference signal $A-B$; a subcarrier signal generator for generating a subcarrier signal S having a frequency substantially higher than the highest audio frequency to be transmitted; suppressed-carrier amplitude modulation means for amplitude-modulating said difference signal with said subcarrier to develop a double-sideband amplitude-modulated subcarrier signal $$(A-B)\cos\omega_s t$$

means for deriving a pilot signal S' related in frequency to said subcarrier; a frequency modulotor; and means for effectively applying said double-sideband amplitude-modulated subcarrier signal, said pilot signal and said sum signal to said frequency modulator to generate a transmission signal comprising a carrier signal frequency-modulated in accordance with the modulation function $$M(t)=K_1(A+B)+K_2(A-B)\cos\omega_s t+K_3S'$$

where $K_1$–$K_3$ are constants of which constants $K_1$ and $K_2$ are approximately equal to each other and at least an order of magnitude larger than the constant $K_3$.

7. A transmitter for a stereo frequency modulation transmission system comprising: means for developing first and second audio signals A and B; circuit means for combining said audio signals to develop a sum signal $A+B$ and a difference signal $A-B$; a subcarrier signal generator for generating a subcarrier signal S having a frequency substantially higher than the highest audio frequency to be transmitted; suppressed-carrier modulation means for amplitude-modulating said difference signal with said subcarrier to develop a double sideband amplitude-modulated subcarrier signal $$(A-B)\cos\omega_s t$$

said modulation means comprising a balanced beam-deflection tube including a control electrode, a pair of anodes, and a pair of deflectors, means for applying said difference signal to said deflectors, means for applying said subcarrier signal to said control electrode, and a resonant output circuit, resonant at said subcarrier frequency, coupled to said anodes; means for deriving a pilot signal S' related in frequency to said subcarrier; a frequency modulator; and means for effectively applying said double-sideband amplitude-modulated subcarrier signal, said sum signal, and said pilot signal to said frequency modulator to generate a transmission signal comprising a carrier signal frequency-modulated in accordance with the modulation function:

$$M(t)=K_1(A+B)+K_2(A-B)\cos\omega_s t+K_3S'$$

where $K_1$–$K_3$ are constants.

8. A transmitter for a stereo frequency modulation transmission system comprising: means for developing first and second audio signals A and B; circuit means for combining said audio signals to develop a sum signal $A+B$ and a difference signal $A-B$; a subcarrier signal generator for generating a substantially sinusoidal subcarrier signal S having a frequency of at least twice the highest audio frequency to be transmitted; means for amplitude-modulating said difference signal with said subcarrier to develop a double-sideband suppressed-carrier amplitude-modulated subcarrier signal $(A-B)\cos\omega_s t$; means for deriving a pilot signal S' related in frequency to said subcarrier; matrix means for additively combining said sum signal, said double-sideband amplitude-modulated subcarrier signal and said pilot signal to develop a modulation signal of the form:

$$M(t)=K_1(A+B)+K_2(A-B)\ \cos\ \omega_s t+K_3S'$$

in which $K_1$–$K_3$ are constants and the constant $K_3$ is much smaller than constants $K_1$ and $K_2$; frequency modulation means, including a carrier signal generator, for modulating the frequency of a carrier signal in response to variations in amplitude of an applied signal; and means for effectively applying said modulation signal to said frequency modulation means to generate a transmission signal frequency modulated in accordance with said modulation signal.

References Cited by the Examiner

UNITED STATES PATENTS

| | | | |
|---|---|---|---|
| 2,233,183 | 2/1941 | Roder | 179—15 |
| 2,269,688 | 1/1942 | Rath | 332—58 |
| 2,515,619 | 7/1950 | Weyers | 179—15 |
| 2,698,379 | 12/1954 | Boelens | 179—15 |
| 2,776,429 | 1/1957 | Olerud | 179—15 |

DAVID G. REDINBAUGH, *Primary Examiner.*

ROBERT H. ROSE, L. MILLER ANDRUS, *Examiners.*

J. W. SAUNDERS, R. L. GRIFFIN, *Assistant Examiners.*